(12) United States Patent
Yazane

(10) Patent No.: US 6,189,405 B1
(45) Date of Patent: Feb. 20, 2001

(54) POSITION ADJUSTING DEVICE FOR STEERING WHEELS

(75) Inventor: Shigeru Yazane, Kiryu (JP)

(73) Assignee: Kabushiki Kaisha Yamada Seisa Kusho (JP)

( * ) Notice: Under 35 U.S.C. 154(b), the term of this patent shall be extended for 0 days.

(21) Appl. No.: 09/302,393

(22) Filed: Apr. 30, 1999

(30) Foreign Application Priority Data

| Apr. 30, 1998 | (JP) | 10-121318 |
| Sep. 1, 1998 | (JP) | 10-247284 |
| Mar. 24, 1999 | (JP) | 11-080537 |

(51) Int. Cl.⁷ .................................................. B62D 1/18
(52) U.S. Cl. ............................ 74/493; 74/530; 180/444; 280/775
(58) Field of Search ..................... 74/493, 530; 180/444; 280/775

(56) References Cited

U.S. PATENT DOCUMENTS

| 4,541,298 | * | 9/1985 | Strutt | 74/493 |
| 5,240,284 | * | 8/1993 | Takada et al. | 280/775 |
| 5,320,384 | * | 6/1994 | Arnold et al. | 280/777 |
| 5,607,184 | * | 3/1997 | Barton | 280/775 |
| 5,655,413 | * | 8/1997 | Barton | 74/493 |
| 5,730,465 | * | 3/1998 | Barton et al. | 280/775 |
| 5,732,791 | * | 3/1998 | Pinkos et al. | 180/444 |
| 6,036,228 | * | 3/2000 | Olgren et al. | 280/775 |
| 6,068,295 | * | 5/2000 | Skabrond et al. | 280/775 |

* cited by examiner

*Primary Examiner*—Allan D. Herrmann
(74) *Attorney, Agent, or Firm*—Morrison Law Firm

(57) ABSTRACT

Horizontal slots and vertical slots in a fixed bracket and a movable bracket of a steering device provide a simple and compact structure for the adjustment of a steering wheel. A tightening shaft passes through both the horizontal and vertical slots. The operator adjusts the tightening shaft to provide either for free movement of the steering wheel, or for locking of the steering wheel in an operator selected position. This structure provides for the simultaneous adjustment of not only the tilting and telescoping of the steering wheel, but also for the inclination of the rotation plane of the steering wheel.

14 Claims, 15 Drawing Sheets

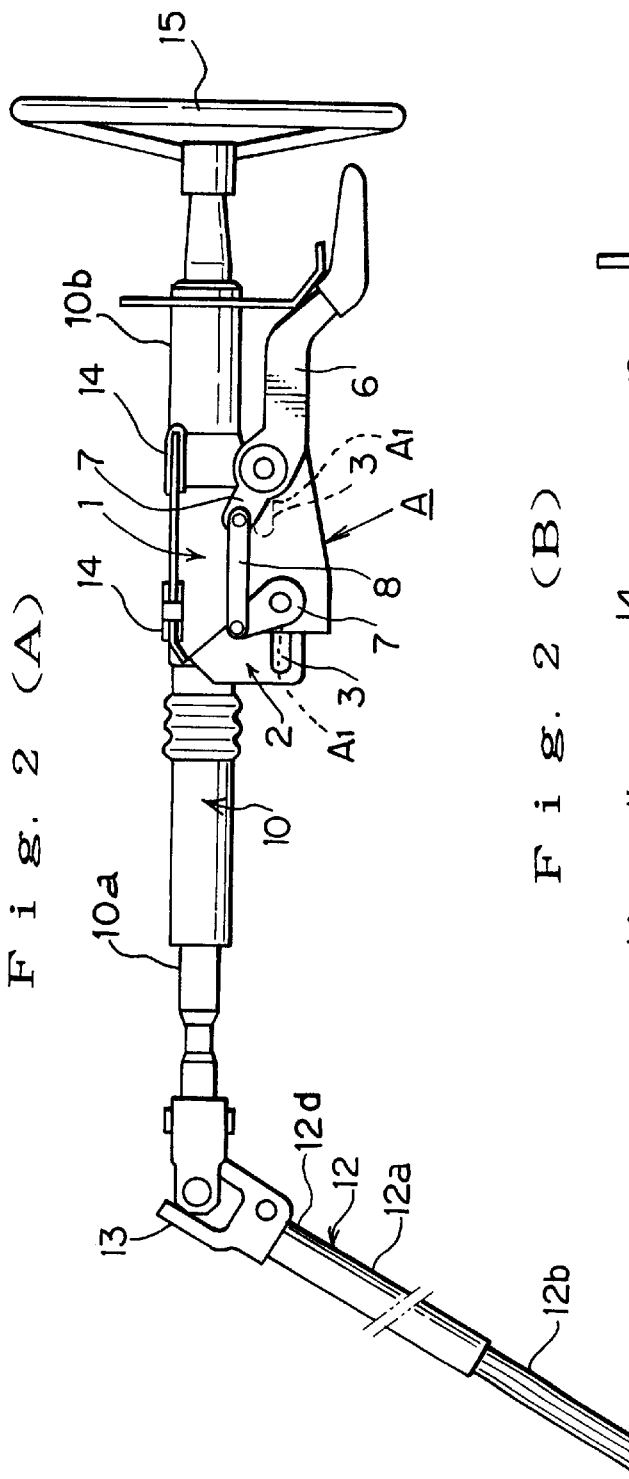
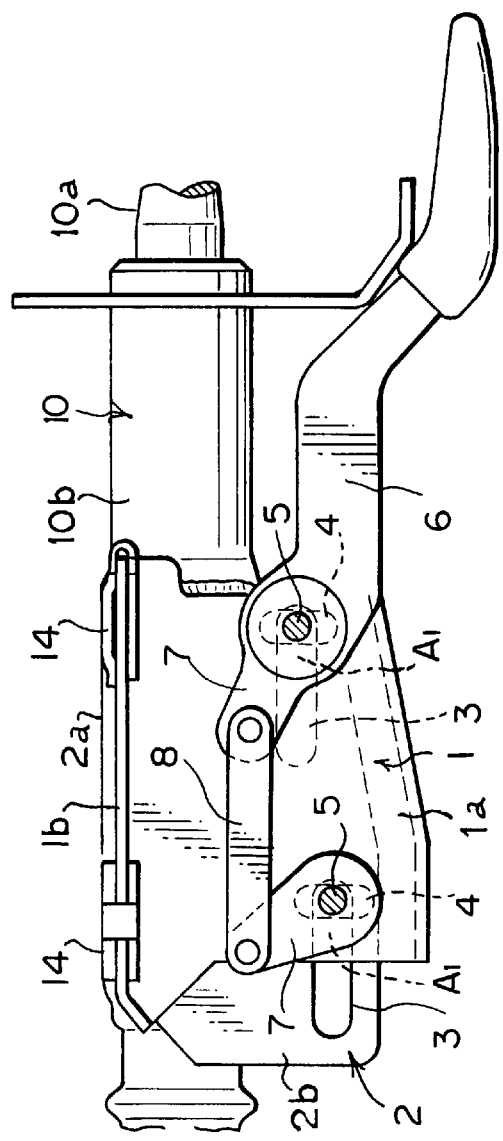
Fig. 2 (A)
Fig. 2 (B)

Fig. 1 2 (A)
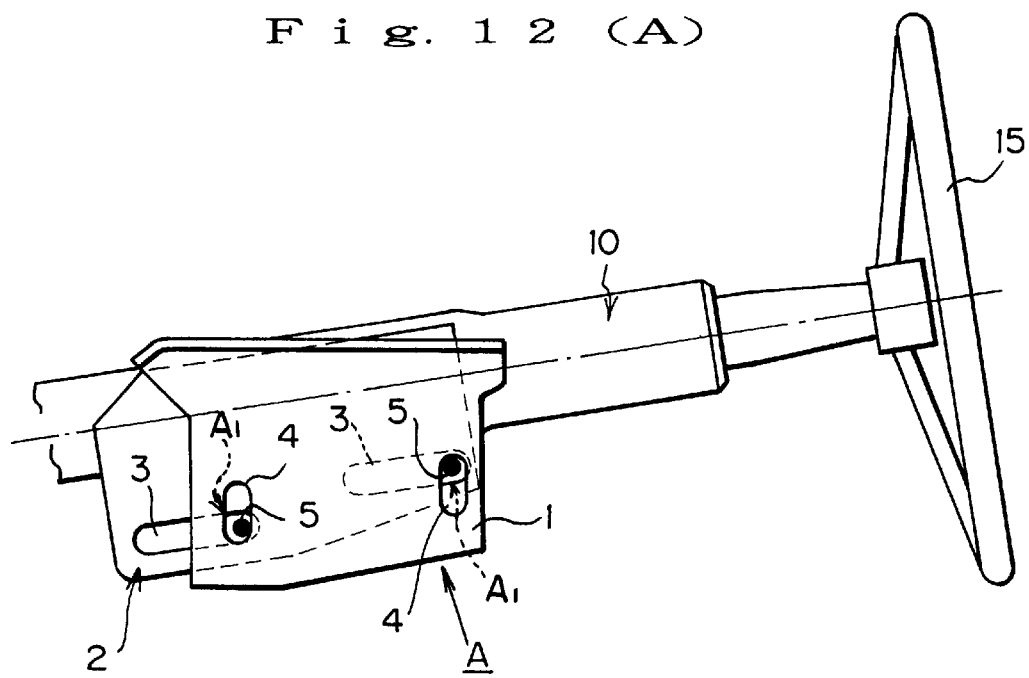
Fig. 1 2 (B)
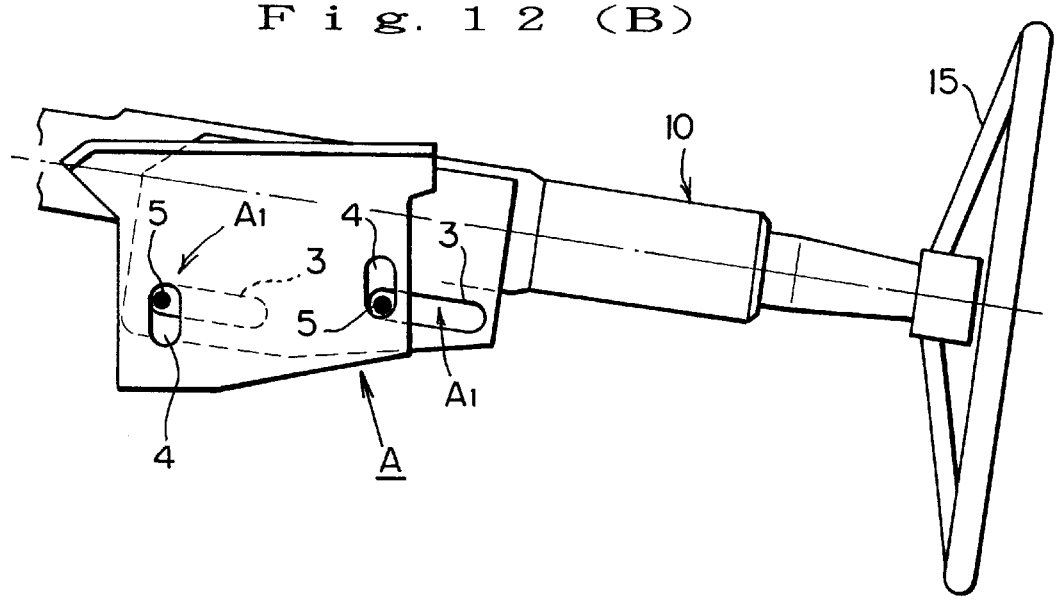

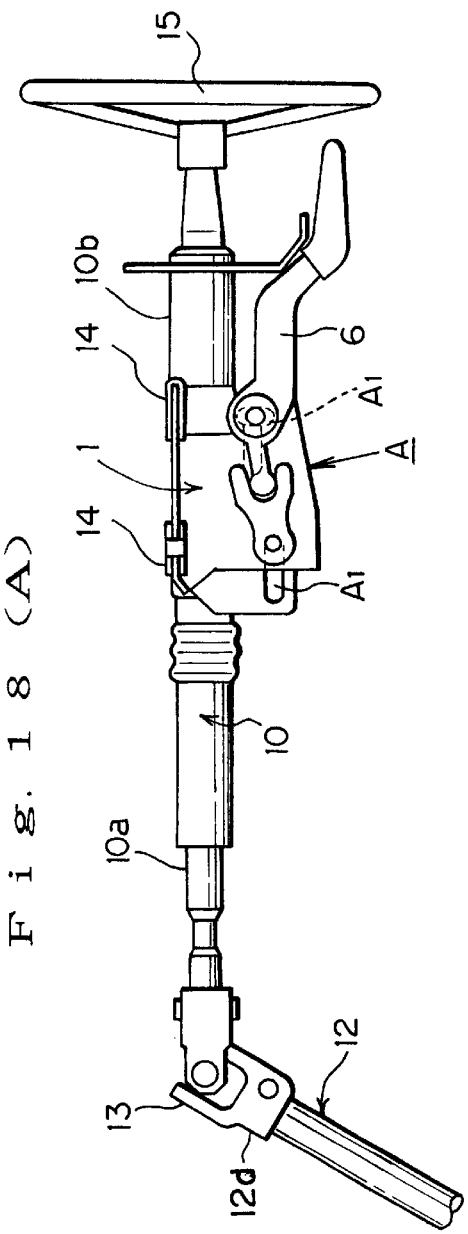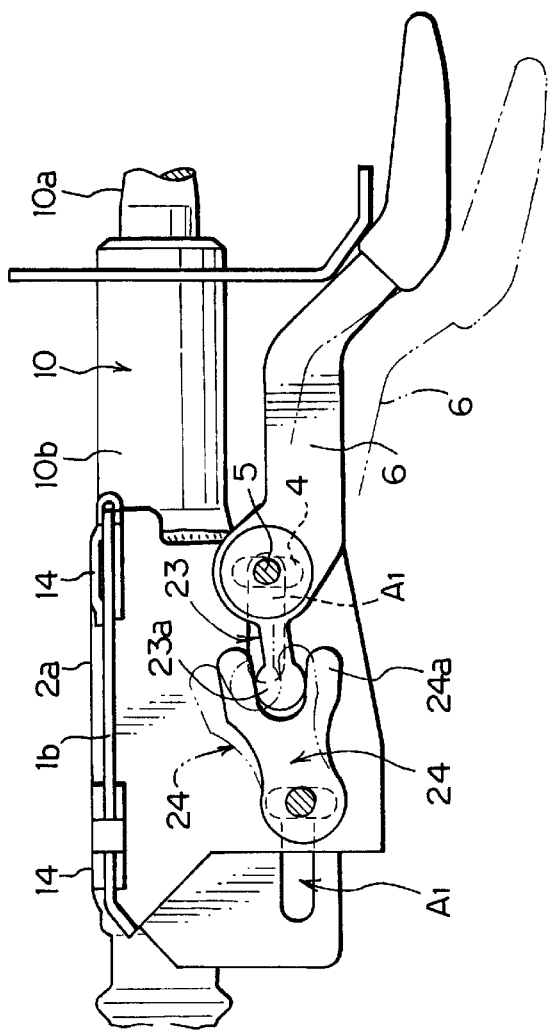
Fig. 18 (A)
Fig. 18 (B)

POSITION ADJUSTING DEVICE FOR STEERING WHEELS

BACKGROUND OF THE INVENTION

The present invention relates to a position adjusting device for steering wheels which provides optimal conditions for the driver through appropriate adjustments. More specifically, the present invention relates to a position adjusting device for steering wheels providing for both the tilting/telescoping of the steering wheel as well as for adjustment of the incline of the rotating surface of the steering wheel.

Various steering devices having tilting and telescoping features have been developed in the past. Japanese patent publication number 48-33567 discloses a fixing slot along a Y—Y direction extending parallel to a steering wheel bracket fixed to a vehicle. A second fixing slot along an X—X direction roughly perpendicular to the Y—Y direction is formed on a stay that is integral with a housing. A middle shaft and a lower shaft connect with a universal joint. An upper shaft attaches to a steering wheel.

The middle shaft and the lower shaft are meshed via splines which allow motion in the Y—Y direction. Thus the steering wheel can be simultaneously adjusted in the X—X direction and the Y—Y direction.

For this adjustment, the connection section of the universal joint interposed between the upper shaft and the middle shaft serves as the support section (pivot). This support section is positioned on the axis of the middle shaft, which moves only in the Y—Y direction while it remains stationary in the X—X direction (i.e., extends and retracts in one direction only). In other words, the support section is displaced only in the axial direction while remaining stationary in the axial sliding direction.

In Japanese laid-open utility model number 62-130947, a device adjusts the position of a steering wheel up and down or forward and back. A middle shaft connects a column shaft and a steering gear. A connecting section capable of moving solely in the axial direction is mounted on the middle shaft. When the column shaft is adjusted up and down or forward and back, the middle shaft extends and retracts while also pivoting.

In Japanese utility model publication number 2-24366, the tilting/telescoping adjustment device rotates in tandem with a middle shaft, which extends and retracts axially. A support section is disposed below the column and is displaced along the axis of the steering shaft.

In Japanese laid-open utility model publication number 48-14729, slots extending up and down are disposed on either side of a position fixing screw on a bracket toward the car, while slots extending front and back are disposed on the bracket toward the column near the steering wheel. A support opening is disposed opposite and below these slots so that front and rear support sections are kept from moving forward or backward. These support sections are only allowed to be moved up or down (along the axis of the shaft).

In Japanese utility model publication number 60-37891 and Japanese utility model publication number 59-41895, mechanisms that allow tilting with simple structures are described.

In the conventional technologies described above, the devices presented adjust the steering wheel position both up and down and forward and backward. When the up/down and forward/backward adjustments are made so that the support section below the column is moved in tandem with the column shaft, the position of the support section is not restricted. Thus, free adjustments are allowed to be made over a wide range.

However, the position of the support section changes only based on where the vertical and horizontal slots are combined. Thus, the vertical slot position relative to the horizontal slot formed on the bracket, i.e. the adjustment of vertical pivoting, can be performed solely along the slots.

If the steering wheel is to be positioned up or down from a forward or rear position, the adjustment must be made within the vertical pivoting range centered on the support section. This makes it difficult to freely select an optimal position suited to the physical characteristics of the driver.

Further optimal positioning can be provided if it were possible to make fine adjustments in the incline of the rotation surface of the steering wheel, thus providing comfortable steering conditions for the driver. However, in the conventional structures, fine adjustments are unable to be made to the steering wheel. Adequate adjustments for optimal positions is not possible is these conventional structures.

In the conventional structure, the support section is positioned below the column and adjustments to the steering wheel are performed along horizontal and vertical slots in a single direction. Consideration was not made to provide adjustments for upward or downward inclines of the steering wheel in addition to the vertical pivoting of the steering wheel. Furthermore, there was no consideration made at all to provide fine adjustments to the steering wheel plant using this structure (for providing up/down adjustments around the support section). Also, making this type of structure simple would prove difficult.

For example, changing the incline of the rotation plane of the steering wheel using the conventional structures as a base, a spherical bearing could be added to the attachment section between the steering shaft and the steering wheel to move the steering wheel plane. However, adding this kind of structure makes the device that much more complex, increasing the number of parts, and making the device more expensive. Also, making the device compact and light becomes difficult.

Based on the above, it can be seen that the conventional technology does not provide a structure for adjusting the rotation plane of the steering wheel in a device for adjusting the tilting and telescoping. Thus, there is a need for the development of a new steering wheel that allows easy adjustment of the incline of the steering wheel rotation plane using a tilting/telescoping adjustment device.

OBJECTS AND SUMMARY OF THE INVENTION

The object of the present invention is to provide a position adjusting device for steering wheels which overcomes the foregoing problems.

A further object of the present invention is to provide adjustment not only of tilting/telescoping of a steering wheel but also of the incline of a rotation plane of the steering wheel.

Another object of the present invention is to provide adjustment not only of tilting/telescoping of a steering wheel but also of the incline of a rotation plane of the steering wheel through a very simple structure and simple operations.

Briefly stated, the present invention relates to horizontal slots and vertical slots in a fixed bracket and a movable bracket of a steering device providing a simple and compact structure for the adjustment of a steering wheel. A tightening shaft passes through both the horizontal and vertical slots. The operator adjusts the tightening shaft to provide either for free movement of the steering wheel, or for locking of the steering wheel in an operator selected position. This structure provides for the simultaneous adjustment of not only the tilting and telescoping of the steering wheel, but also for the inclination of the rotation plane of the steering wheel.

According to an embodiment of the present invention, there is provided a device for adjusting the position of a steering wheel comprising: a fixed bracket fixed to a vehicle body; a movable bracket supported by the fixed bracket; a steering shaft on the movable bracket; at least a first slot, generally parallel to a longitudinal axis of the steering shaft, on one of the fixed bracket and the movable bracket; at least a second slot, at an angle to the first slot, on another one of the fixed bracket and the movable bracket; at least one slot intersection section formed by an intersection of the first slot and the second slot; at least one tightening shaft passing through the slot intersection section; and tightening means for tightening the movable bracket against the fixed bracket, to fix the steering wheel at a user selected position.

According to another embodiment of the present invention, there is provided a device for adjusting the position of a steering wheel comprising: a fixed bracket fixed to a vehicle body; a movable bracket supported by the fixed bracket; a steering shaft on the movable bracket; a middle shaft having a first end movably connected to the steering shaft; the middle shaft having a second end connected to a steering gear; at least a first slot generally parallel, to a longitudinal axis of the steering shaft, on one of the fixed bracket and the movable bracket; at least a second slot, at an angle to the first slot, on another one of the fixed bracket and the movable bracket; at least one slot intersection section formed by an intersection of the first slot and the second slot; at least one tightening shaft passing through the slot intersection section; and tightening means for tightening the movable bracket against the fixed bracket, to fix the steering wheel at a user selected position.

According to a further embodiment of the present invention, there is provided a device for adjusting the position of a steering wheel comprising: a fixed bracket fixed to a vehicle body; a movable bracket supported by the fixed bracket; a steering shaft on the movable bracket; a flexible transmission means interposed between the steering shaft and a steering gear; at least a first slot, generally parallel to a longitudinal axis of the steering shaft, on one of the fixed bracket and the movable bracket; at least a second slot, at an angle to the first slot, on another one of the fixed bracket and the movable bracket; at least one slot intersection section formed by an intersection of the first slot and the second slot; at least one tightening shaft passing through the slot intersection section; and tightening means for tightening the movable bracket against the fixed bracket, to fix the steering wheel at a user selected position.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 2(A) is a schematic side-view drawing of the present invention.

FIG. 2(B) is an enlarged schematic side-view drawing of the bracket section.

FIG. 12(A) shows the tilt adjusted upward and the telescoping adjustment at a maximum setting and retracted.

FIG. 12(B) shows the tilt adjusted downward and the telescoping adjustment at a maximum setting and retracted.

FIG. 18(A) is a side-view drawing of the present invention that uses a second embodiment of a tightening structure between the fixed bracket and the movable bracket.

FIG. 18(B) is an enlarged side-view drawing of the main elements from FIG. 18(A).

DETAILED DESCRIPTION OF THE PREFERRED EMBODIMENTS

Figure 1:
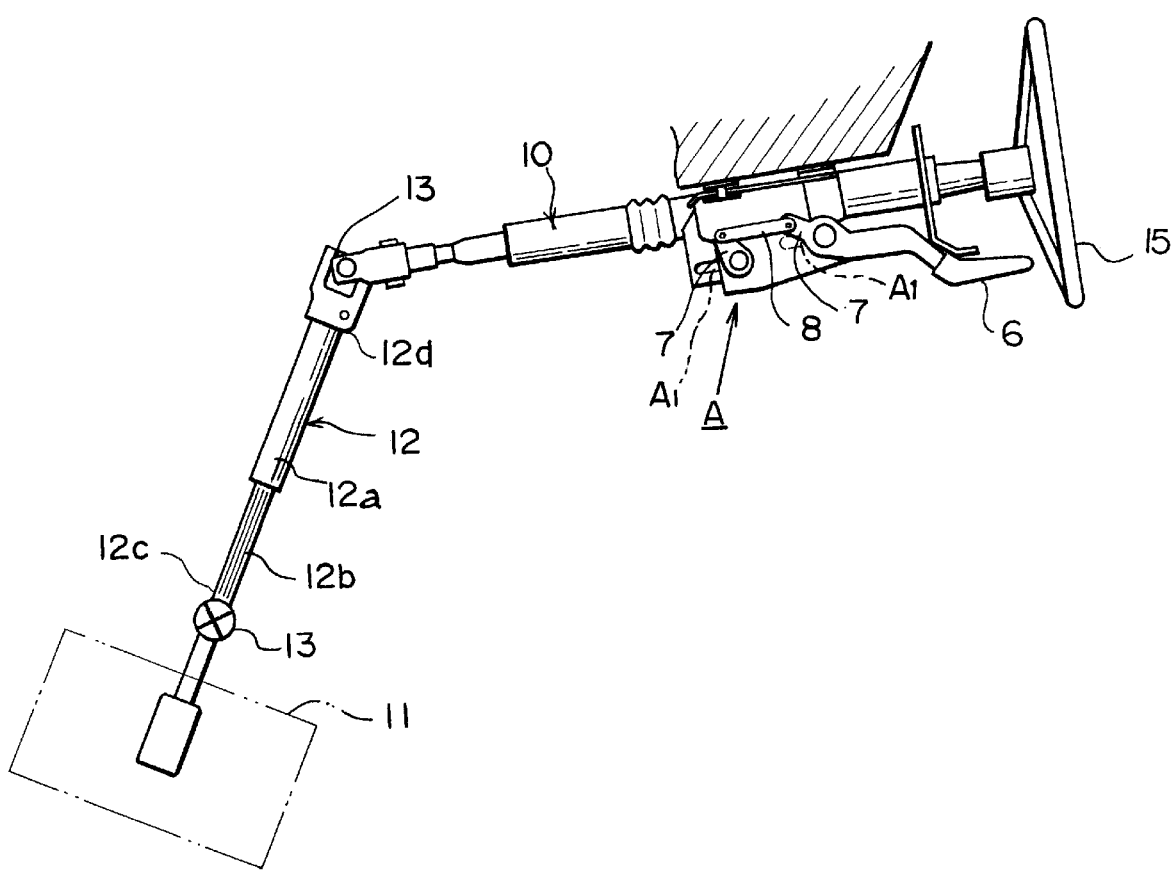
FIG. 1 is a side-view drawing showing the overall structure of the present invention.
Figure 3:
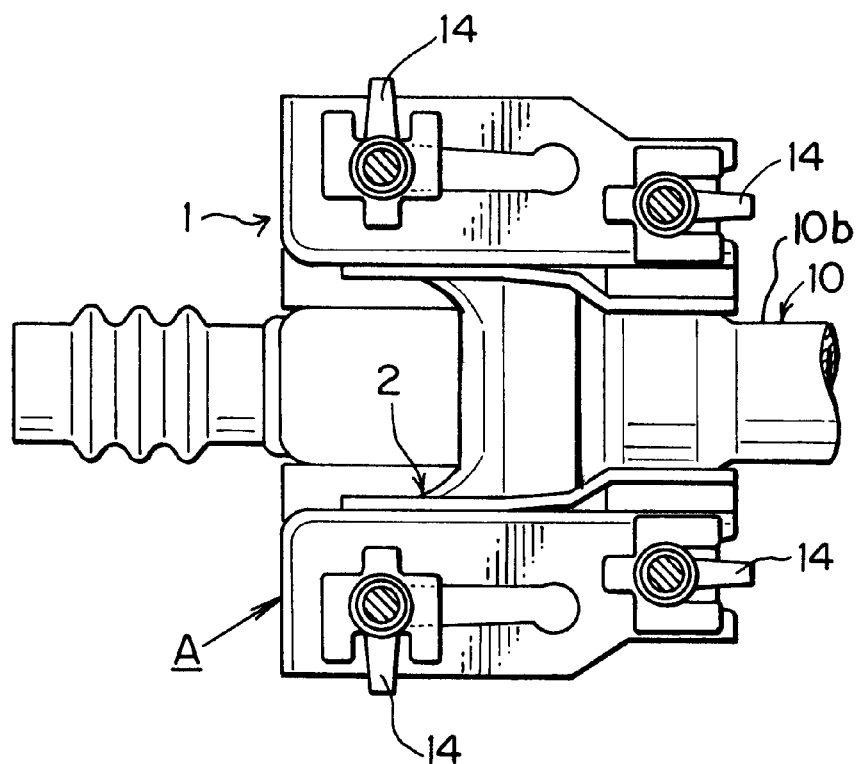
FIG. 3 is a plan drawing of the bracket section of FIG. 2(A).
Figure 4:
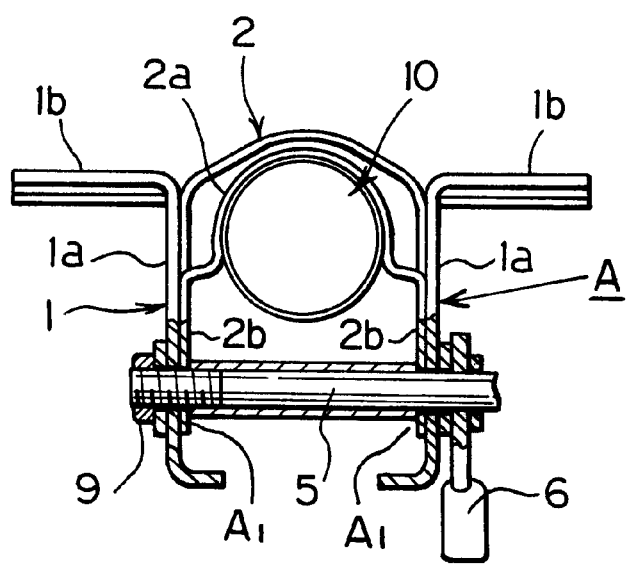
FIG. 4 is a partially cut away schematic front-view drawing of the bracket section of FIG. 2(A).
Figure 5:
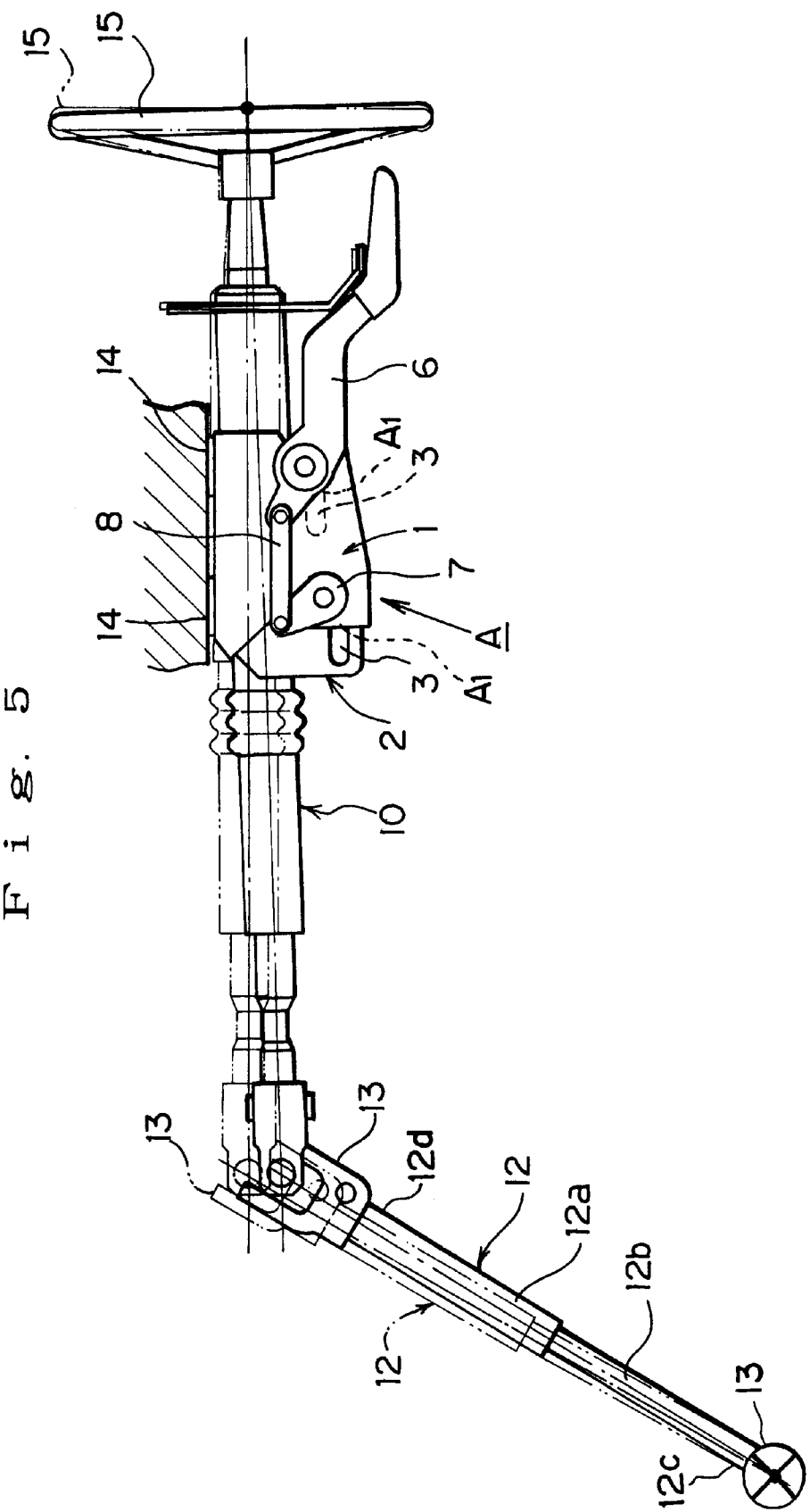
FIG. 5 is a drawing showing the steering wheel tilted.

Referring to FIGS. 1–4, a bracket A includes a fixed bracket 1, fixed at a prescribed position of a car, and a movable bracket 2, supported by fixed bracket 1. A steering wheel position adjustment section is formed from slot intersections $A_1$, disposed at lateral ends of bracket A.

Fixed bracket 1 is formed from left and right support side plates 1a and attachment plates 1b. Support side plates 1a are parallel to each other. Attachment plates 1b are fixed at a prescribed position in the car with capsule members 14. If there is an impact, such as from a collision, attachment plates 1b slide while receiving resistance from the attachment position, absorbing the shock and protecting the driver from accidents.

Movable bracket 2, formed from a shaft support member 2a and a movable support side plate 2b, is mounted between support side plates 1a of fixed bracket 1. Slot intersection $A_1$, is formed from a horizontal slot 3 and a vertical slot 4 formed respectively on fixed bracket 1 and movable bracket 2. Horizontal slot 3 is not required to be formed horizontally in fixed bracket 1. Horizontal slot 3 is formed generally parallel to a longitudinal axis of the steering shaft 10. Vertical slot 4 is formed at an angle to horizontal slot 3. Preferably, vertical slot 4 is perpendicular to horizontal slot 4. Slot intersection $A_1$ allows a steering wheel 15 to be tilted and telescoped. Furthermore, fine adjustments of the inclination of a rotation plane of steering wheel 15 is also possible. There is no requirement to the number of horizontal slots 3 and vertical slots 4 to form slot intersection $A_1$. Preferably, there is at least one horizontal slot 3 and at least one vertical slot 4, forming at least one slot intersection $A_1$. More preferably, there are a plurality of horizontal slots 3 and vertical slots 4, forming a plurality of slot intersections $A_1$. Even more preferably there are two horizontal slots 3 and two vertical slots 4, forming two slot intersections $A_1$.

Support plate 1a of fixed bracket 1 and movable support plate 2b of movable bracket 2 come into contact such that the range over which horizontal slot 3 and vertical slot 4 intersect determines slot intersection section $A_1$. A pair of slot intersection sections $A_1$, is formed at lateral ends of bracket A. A tightening shaft 5 passes through slot intersection sections $A_1$. Engagement between tightening shaft 5 and a nut member 9 allows movable bracket 2 to be appropriately fixed to fixed bracket 1.

A lever 6 is mounted on tightening shaft 5. Tightening shaft 5 is rotated together with lever 6 to tighten or loosen the engagement between fixed bracket 1 and movable bracket 2.

Two slot intersection sections $A_1$ are formed on bracket A along an axis of a steering shaft 10. Vertical slot 4 is formed on support plates 1a of fixed bracket 1. Horizontal slot 3 is formed on movable support plates 2b of movable bracket 2.

Tilting operations are provided by the displacement of movable bracket 2 roughly vertically along a longitudinal axis of vertical slot 4 relative to fixed bracket 1. Telescoping operations are provided by the displacement of movable bracket 2 roughly horizontally along a longitudinal axis of horizontal slot 3 relative to fixed bracket 1. In this manner, steering wheel 15 is set to a desired position. By operating lever 6, tightening shaft 5 is tightened to fix the tilt/telescoping position.

Steering wheel 15 is supported by and fixed to movable bracket 2. Steering shaft 10 is formed from a shaft member 10a, mounted on steering wheel 15, and a column member 10b, rotatably supporting shaft member 10a. Steering shaft 10 movably connects to a steering gear 11 through a middle shaft 12. Steering gear 11 provides steering through a rack-and-pinion mechanism or the like.

Middle shaft 12 is retractable along its axis. More specifically, middle shaft 12 is formed as a spline structure. Middle shaft 12 includes a hollow shaft 12a and a spline shaft 12b, which slides inside hollow shaft 12a. Thus, middle shaft 12 is capable of retraction and extension along its axis.

Universal joints 13 are used on both ends of middle shaft 12 to connect a one end of middle shaft 12 to steering shaft 10 and the other end of middle shaft 12 to steering gear 11. On one end of middle shaft 12 is formed a pivot point 12c, connecting middle shaft 12 to steering gear 11 through universal joint 13. With this structure, middle shaft 12 is able to pivot around pivot point 12c. At the other end of middle shaft 12 is formed a connecting section 12d, connecting middle shaft 12 with steering shaft 10 through universal joint 13.

Figure 16:
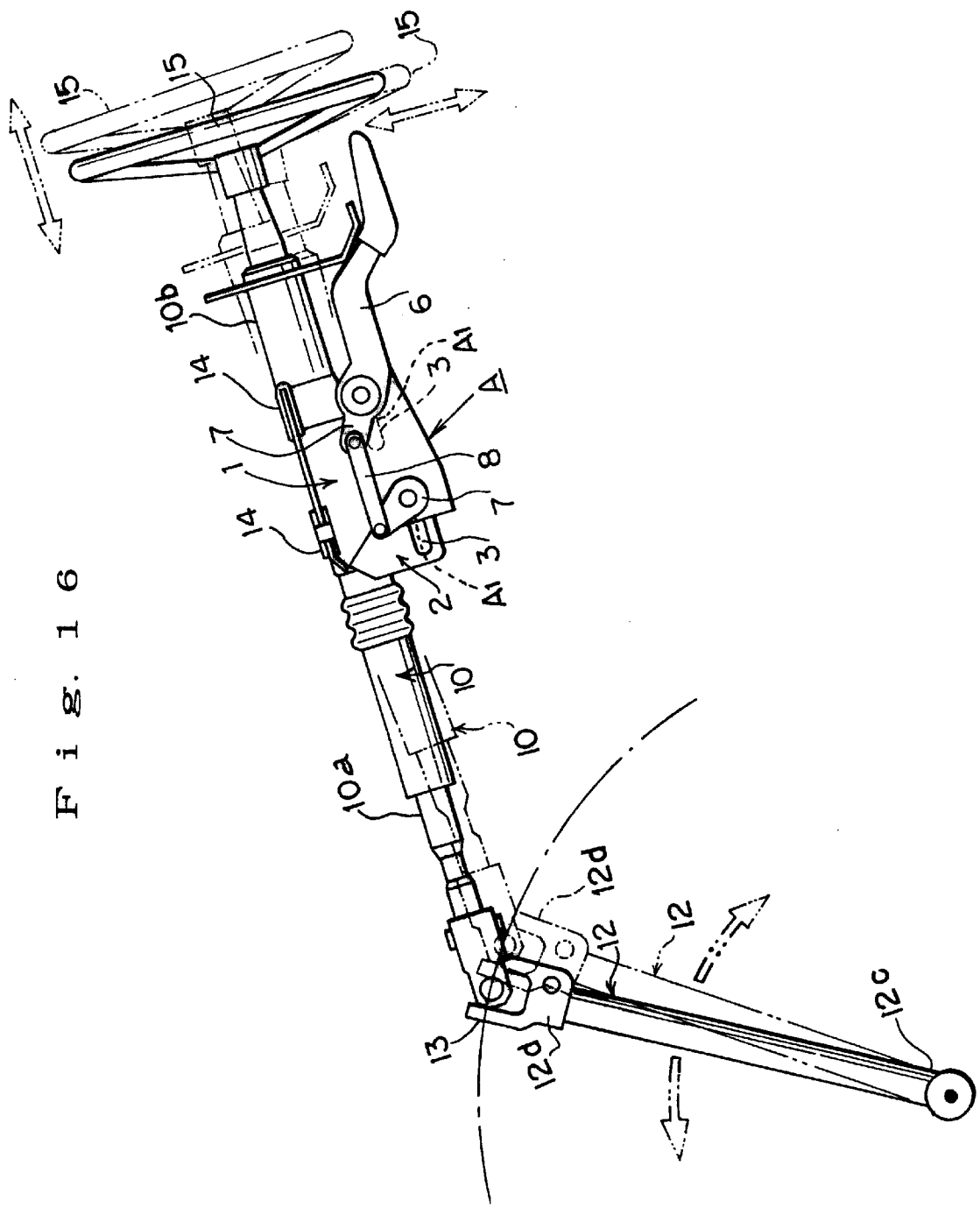
FIG. 16 is a side-view drawing of the overall structure of the present invention in which a non-retractable rigid axis is used as the middle shaft.

Referring to FIG. 16, in an alternative embodiment of middle shaft 12, a single rigid shaft that does not retract or extend axially is used.

Figure 8:
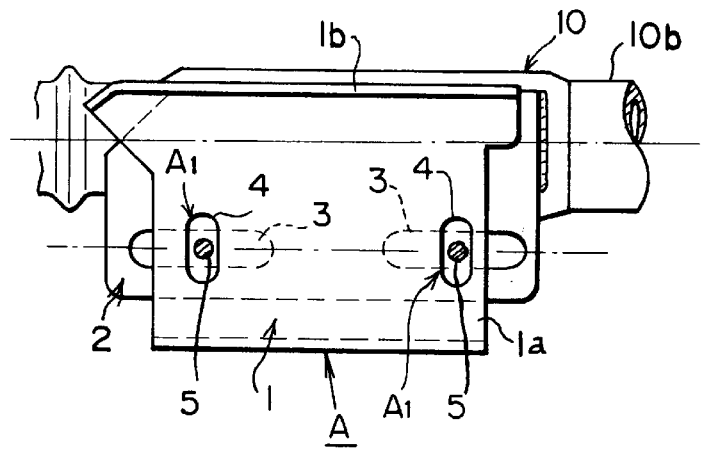
FIG. 8 is a schematic drawing of an embodiment in which slot intersections are disposed along a single horizontal line parallel to the axis of the steering shaft.

Referring to FIG. 8, there are various types of slot intersection sections $A_1$. In a first type, two slot intersection sections $A_1$ are formed along an axis of steering shaft 10 when steering shaft 10 is in its initial setting (its neutral position). Two slot intersection sections $A_1$ are separated by a prescribed distance and disposed on bracket A along a single horizontal line.

Figure 6:
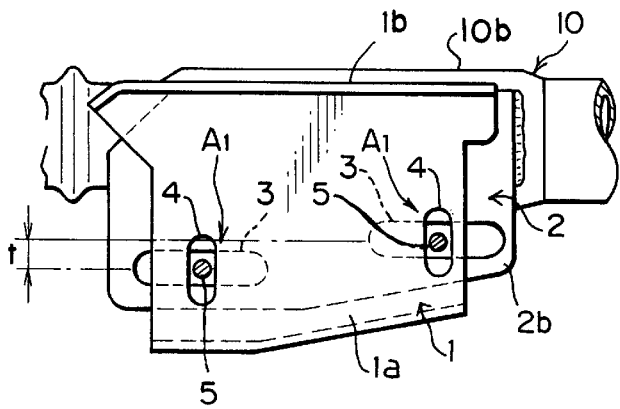
FIG. 6(A) is a side-view drawing of the bracket section having slot intersections with different positions along the up/down axis.
FIG. 6(B) is a side-view drawing of a bracket section different from that of FIG. 6(A) having slot intersections with different positions along the up/down axis.
Figure 6:
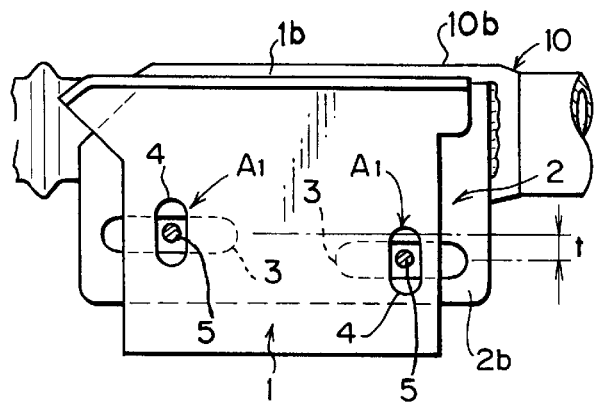

Referring to FIGS. 6(A) and 6(B), in a second type of slot intersection section $A_1$, two slot intersection sections $A_1$ are disposed on bracket A so that when steering shaft 10 is in its neutral position, slot intersection sections $A_1$ are positioned along an axis of steering shaft 10 with a vertical offset of a distance t.

More specifically, front slot intersection section $A_1$ is proximal to steering shaft 10 and rear slot intersection section $A_1$ is distal to steering shaft 10. It is also possible to have the reverse, where front slot intersection section $A_1$ is distal to steering shaft 10 and rear slot intersection section $A_1$ is proximal to steering shaft 10.

Figure 9:
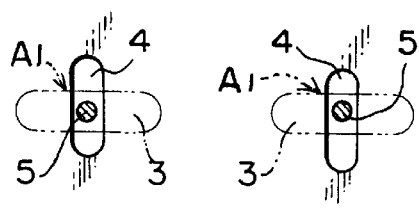
FIG. 9(A) is a schematic drawing showing an embodiment in which one of the upper section and the lower section of the vertical slot (relative to the intersecting point between the vertical and horizontal slots at the slot intersection) is longer.
FIG. 9(B) is a schematic drawing showing an embodiment different from that of FIG. 9(A) in which one of the upper section and the lower section of the vertical slot (relative to the intersecting point between the vertical and horizontal slots at the slot intersection) is longer.
Figure 9:
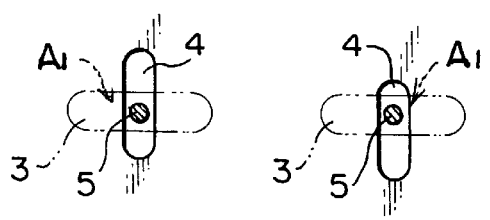
Figure 10:
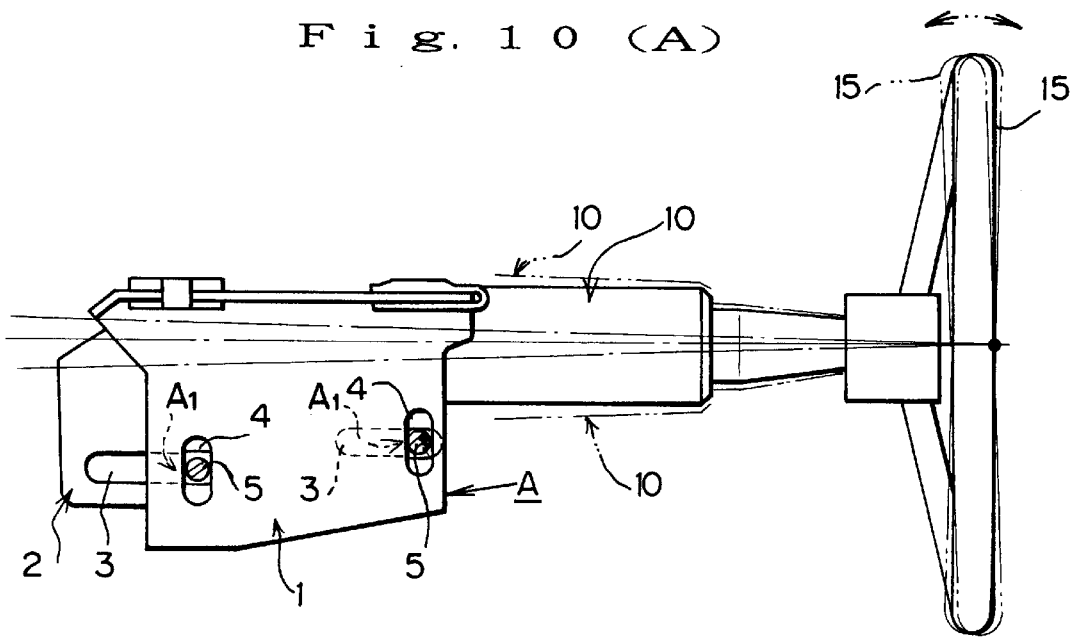
FIG. 10(A) is a schematic drawing showing the incline adjustment range for the rotation surface of the steering wheel.
FIG. 10(B) is a schematic drawing showing the tilting operation.
Figure 10:
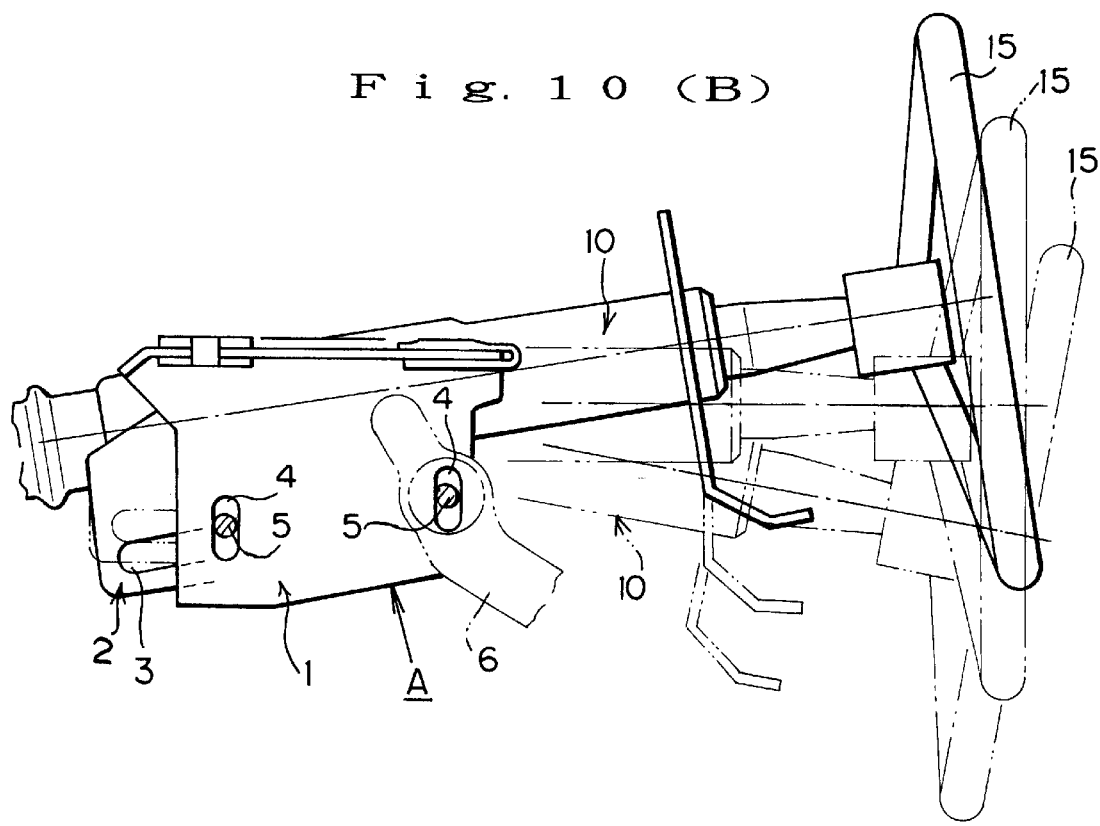
Figure 11:
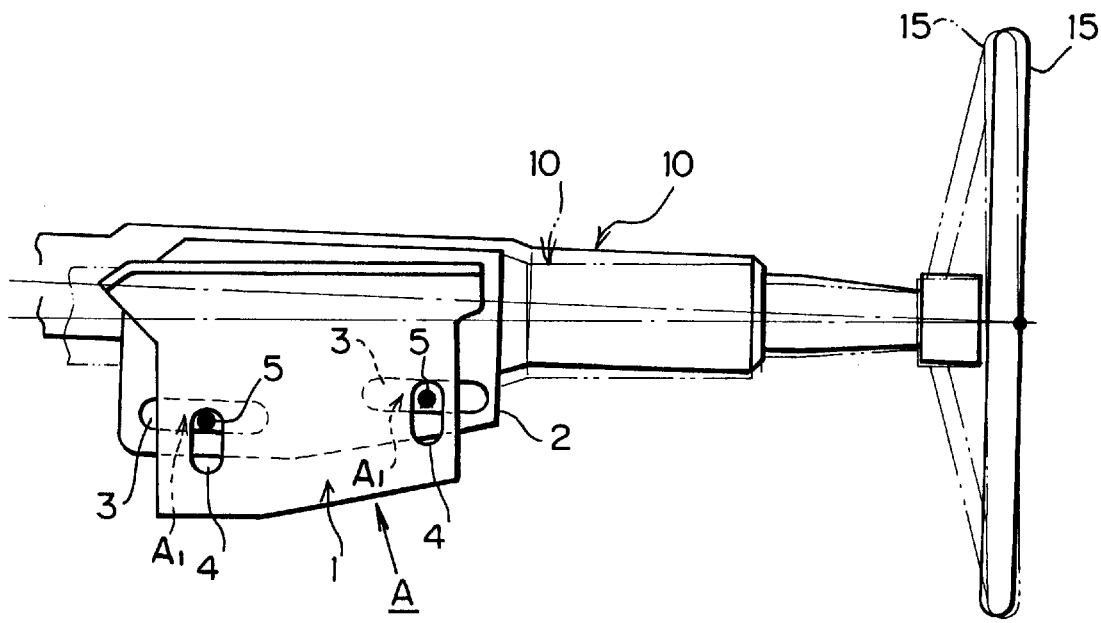
FIG. 11(A) is a schematic drawing showing the rotation surface of the steering wheel inclined slightly upward from the neutral position.
FIG. 11(B) is a schematic drawing showing the rotation surface of the steering wheel inclined slightly downward from the neutral position.
Figure 11:
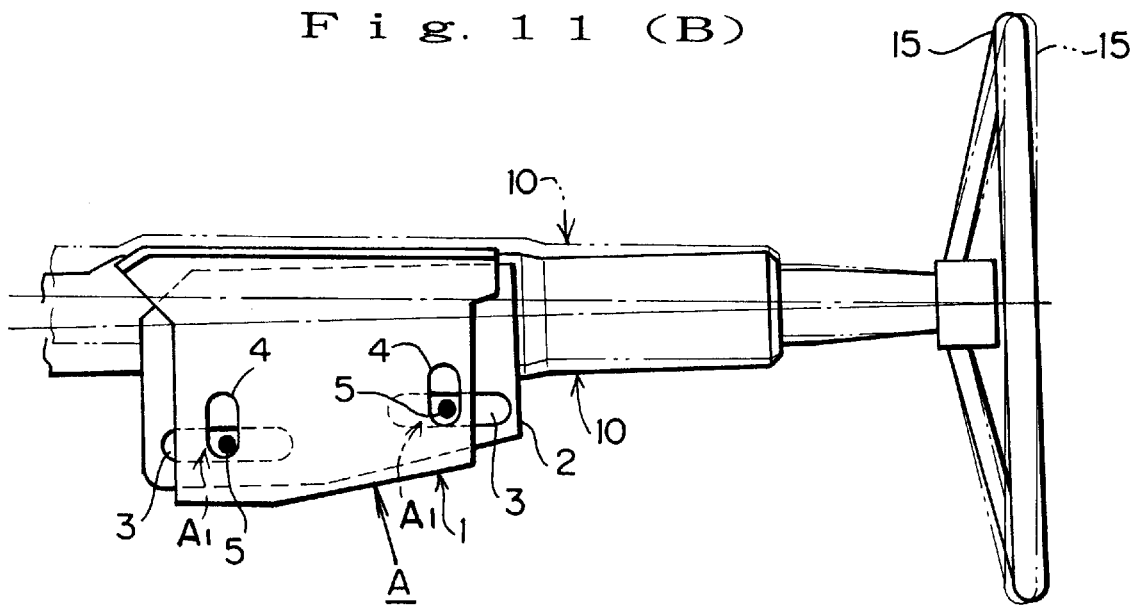

Referring to FIG. 9(B), in another example of slot intersection sections $A_1$, vertical slot 4 close to steering wheel 15 and vertical slot 4 remote from steering wheel 15 are formed so that, in a neutral position, a section above or below the intersection point with horizontal slots 3 has a different length from the other section. In other words, upper sections and lower sections above and below the center line have different lengths.

As a third type of slot intersection section $A_1$, horizontal slot 3 or vertical slot 4 toward the front or the rear is formed with a width (dimension perpendicular to its axis) larger than the diameter of tightening shaft 5, thus forming a slot that provides leeway.

Figure 7:
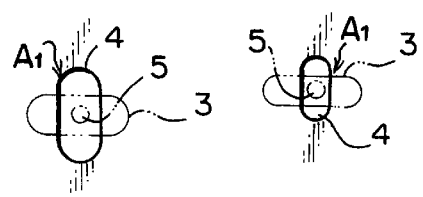
FIG. 7(A) is a schematic drawing of an embodiment in which the slot intersection is formed from slots having widened sections.
FIG. 7(B) is a schematic drawing of an embodiment different from that of FIG. 7(A) in which the slot intersection is formed from slots having widened sections.
Figure 7:
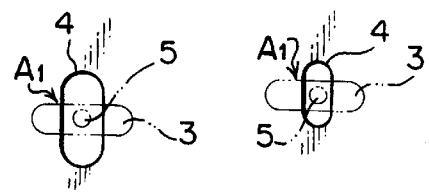

Referring to FIG. 7(A), vertical slot 4 and horizontal slot 3 toward the front of the vehicle (to the left in the figure) are enlarged. Referring to FIG. 7(B), only vertical slot 4 is enlarged. It is also possible to have the widths of both horizontal slot 3 and vertical slot 4 increased.

Referring to FIG. 2(B), the following is a description of an embodiment of a structure in which two tightening shafts 5 passing through two slot intersection sections $A_1$ are rotated simultaneously to allow two slot intersection sections $A_1$ to be tightened or loosened together. On tightening shafts 5 passing through two slot intersection sections $A_1$ are mounted arms 7 which rotate together with tightening shafts 5. One of arms 7 rotates in tandem with lever 6. More specifically, lever 6 and arm 7 are formed integrally. A link 8 connects two arms 7.

Tightening shaft 5, on which lever 6 is mounted, serves as the primary side. The other tightening shaft 5 is referred to as the driven side. When lever 6 is operated, rotating arm 7 and tightening shaft 5 on the primary side, arm 7 and tightening shaft 5 on the driven side are rotated in tandem through link 8. This allows both tightening shafts 5 of both two slot intersection sections $A_1$ to be simultaneously tightened to or disengaged from fixed bracket 1 and movable bracket 2 of bracket A.

Referring now to FIGS. 18(A) and 18(B), in a second embodiment of a structure for simultaneously rotating two tightening shafts 5, an arm 23 rotates in tandem with lever 6. Arm 23 rotates a driven arm 24. Arm 23 is positioned at tightening shaft 5 on the primary side. Driven arm 24 connects with tightening shaft 5 on the secondary side.

An engagement section 23a is formed on arm 23, and an engagement section 24a is formed on driven arm 24. Engagement section 23a engages with engagement section 24a. Preferably, engagement section 24a is formed in a two-pronged shape, and engagement section 23a at the end of arm 23 fits into engagement section 24a.

The engagement structure between engagement section 23a and engagement section 24a is not restricted to the example described above. Various other engagement structures, such as a structure involving a pin, can be used. The engagement between engagement structure 23a and engagement structure 24a allows arm 23 to be rotated so that driven arm 24 is rotated in tandem.

Arm 23 and driven arm 24 are rotated in opposite directions, so tightening shafts 5 of slot intersections $A_1$ are formed with opposite threads. This structure allows tightening shafts 5 to be tightened or released simultaneously.

It is also possible to use an electrically activated structure, where the positioning of the steering wheel is adjusted by tightening or loosening fixed bracket 1 and movable bracket 2 using an electrically powered section through the operation of a switch or the like.

Figure 14:
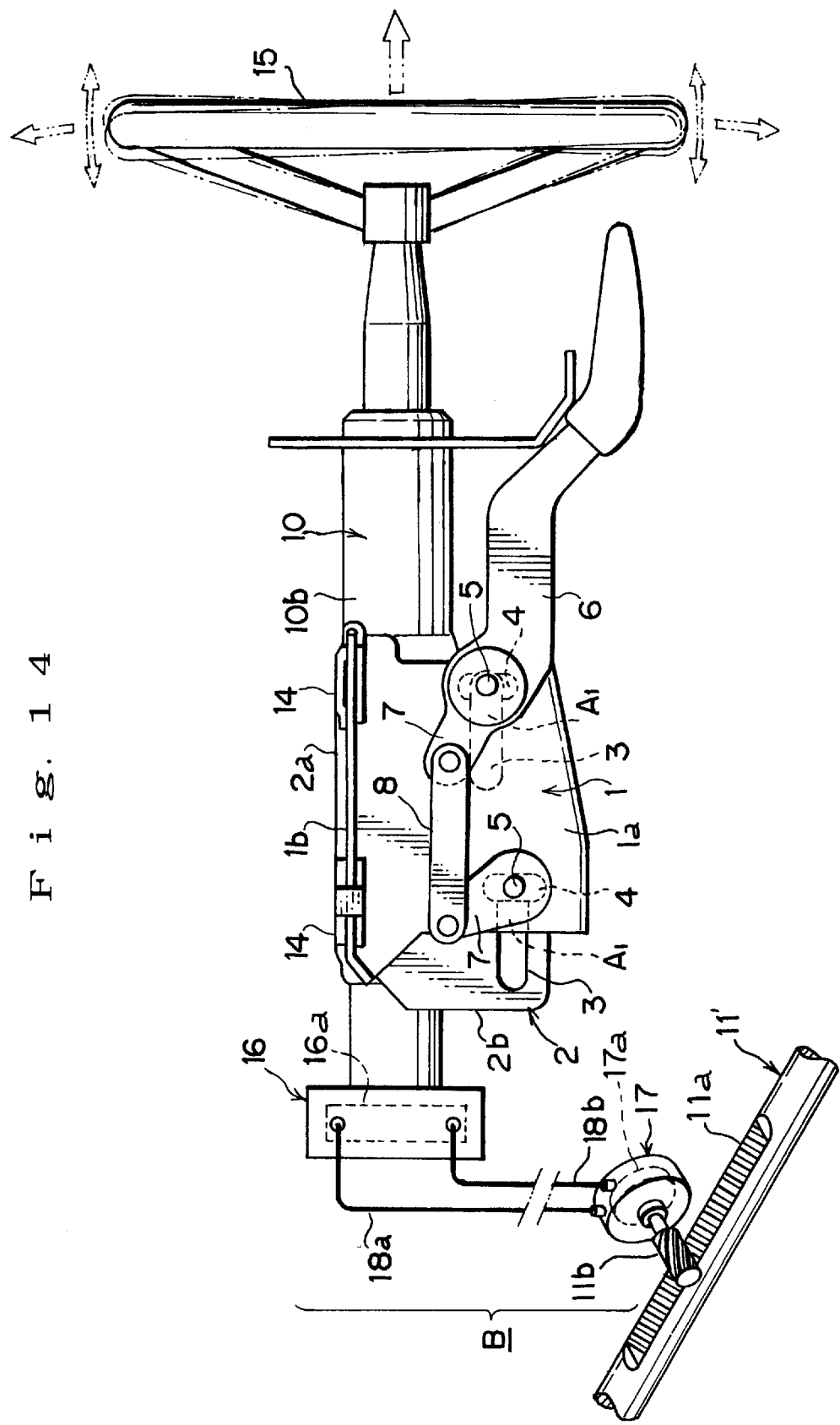
FIG. 14 is a side-view drawing of an embodiment that uses a cable mechanism as transferring means between the steering shaft and the steering gear.
Figure 15:
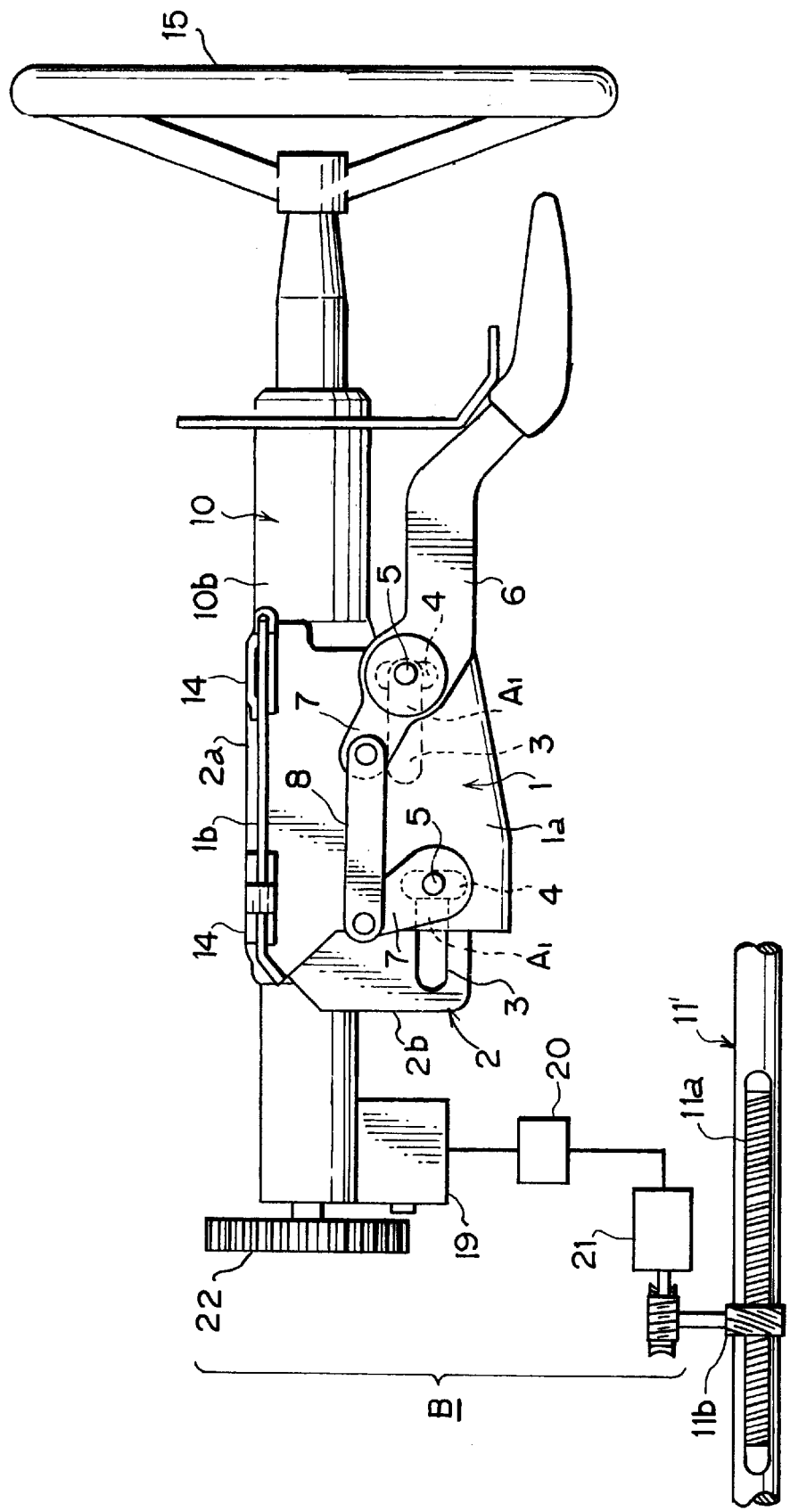
FIG. 15 is a side-view drawing of an embodiment that uses an electrical signal mechanism as transferring means between the steering shaft and the steering gear.

Referring to FIGS. 14 and 15, the following is a description of an embodiment where a flexible transmission means B is installed between steering shaft 10 and steering gear 11. Flexible transmission means B is used in place of middle shaft 12. Flexible transmission means B can involve a cable mechanism, electrical signal conversion, or the like.

In a first embodiment of flexible transmission means B, a steering device is formed with a cable mechanism. A transmission section 16 is installed toward steering shaft 10, and a transmission-receiving section 17 is installed on a steering gear 11'. A pulley 16a and a pulley 17a are mounted inside transmission section 16 and transmission-receiving section 17, respectively.

Cables 18a and 18b extend across pulley 16a and pulley 17a. The rotation of steering wheel 15 is transmitted via cables 18a and 18b and pulleys 16a and 17a.

Pulley 16a of transmission section 16 is rotated by transmission from steering wheel 15 and steering shaft 10.

A pinion gear 11b is disposed at the center of rotation of pulley 17a of transmission-receiving section 17. Pinion gear 11b meshes with rack gear 11a of steering gear 11' and steering from steering gear 11' is applied.

The rotation of pulley 16a inside transmission section 16 causes cables 18a and 18b to rotate the pulley inside transmission-receiving section 17, thus performing the steering from steering gear 11'. A power-assisting mechanism can be used in steering gear 11' to provide a power-steering mechanism.

In a second embodiment of flexible transmission means B, the steering device uses electrical signal conversion. Flexible transmission means B includes a rotation sensor 19, an ECU (Electric Control Unit) 20, and a motor 21. The rotation of steering shaft 10, which rotates in tandem with steering wheel 15, is converted by rotation sensor 19 into an electrical signal.

ECU 20 is an electronic control unit. Various types of ECUs are available, such as a device using sequence circuits or microprocessors. Rotation sensor 19 is disposed close to a gear member 22 mounted toward an end of steering shaft 10. ECU 20 connects between rotation sensor 19 and motor 21. Gear member 22 rotates in tandem with steering shaft 10 and the steering orientation and angle are detected by rotation sensor 19 by gear member 22. This signal is sent to ECU 20.

Based on this electrical signal, ECU 20 controls motor 21 of steering gear 11'. Steering is applied to steering gear 11' as well as pinion gear 11b and rack gear 11a through a gear mechanism mounted on motor 21. In the steering device of this embodiment, steering shaft 10 and steering gear 11' are electrically connected by a power supply. An electrical signal is used for transmission of the rotation of steering wheel 15 to steering gear 11'.

Gear member 22 detects the rotation direction and the rotation angle as described above. In place of this, it is also possible to use a disc having a hole. Alternatively, a middle gear (not shown in the figures) can be installed between gear member 22 and rotation sensor 19 so that the gear transmits a signal to rotation sensor 19 through the middle gear.

Compared to using middle shaft 12 as described above, flexible transmission means B provides a greater degree of freedom in the positioning of steering shaft 10 and steering wheel 15. Also, since steering shaft 10 is not restricted by its position relative to steering gear 11, telescoping and tilting of steering shaft 10 is made much smoother. Furthermore, since middle shaft 12 is not used, the mounting position of steering shaft 10 and the position of steering wheel 15 is relatively freely set. Also, vibrations from steering gear 11 are prevented from reaching steering shaft 10 and steering wheel 15.

Figure 13:
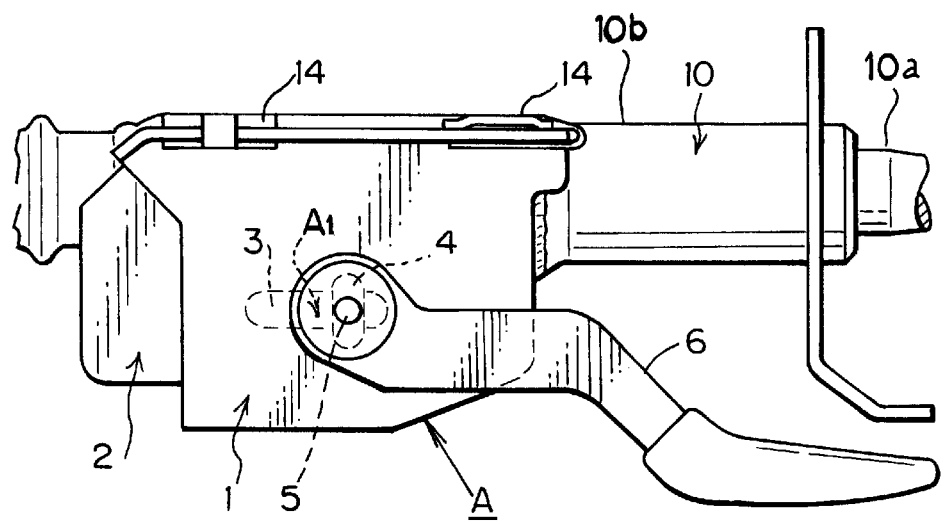
FIG. 13(A) shows a side-view drawing of the bracket section of an embodiment with a single slot intersection.
FIG. 13(B) shows the telescoping and rotation plane adjustment range for a steering wheel having a single slot intersection.
Figure 13:
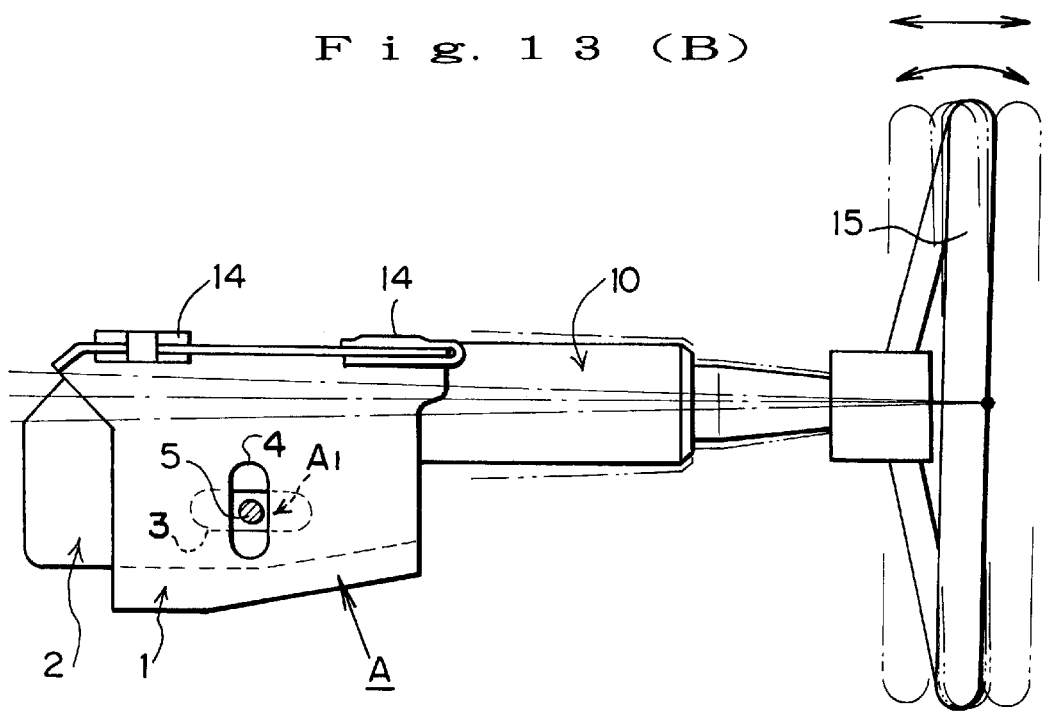

Referring to FIGS. 13(A) and 13(B), an alternate embodiment of the present invention is shown where only one slot intersection section $A_1$ is formed on bracket A along an axis of steering shaft 10. Furthermore, vertical slot 4 of slot intersection section $A_1$ does not need to be formed perpendicular to steering shaft 10. Vertical slot 4 can be formed at an angle or in an arcuate shape.

The following is a description of the operation of the present invention.

A movable support point is disposed at a position between slot intersection section $A_1$ of steering shaft 10 and universal joint 13 of middle shaft 12. This movable support point allows middle shaft 12 to retract along its axis and pivot. This movable support point is formed to follow the tilting/telescoping motion of steering shaft 10. With this structure, diagonal adjustments can be made in addition to the directions of horizontal slot 3 and vertical slot 4 of slot intersection section $A_1$.

The tilting/telescoping position adjustments along the direction of the slots are applied through the positioning of the connection support point (at universal joint 13) according to the tilting/telescoping adjustment position of steering shaft 10. With diagonal adjustments in directions other than those of horizontal slot 3 and vertical slot 4 of slot intersection section $A_1$, the rotation plane of steering wheel 15 is adjusted slightly upward or downward.

Referring to FIGS. 5, 10(A), 11(A) and 11(B), the rotation plane of the steering wheel can be adjusted diagonally by using the position adjustment section between the tilting/telescoping slots and steering shaft 10 as a movable support point to displace universal joint 13 of steering shaft 10 and middle shaft 12. The displacement of universal joint 13 of steering shaft 10 and middle shaft 12 is performed through the retractable and pivotable structure of middle shaft 12. Adjustments can be freely made to tilting/telescoping positions through combining the tilting/telescoping slot orientations and the movable support point of universal joint 13 between steering shaft 10 and middle shaft 12.

By having a pair of tilting/telescoping slot intersection sections $A_1$ disposed on bracket A, a pair of tilting/telescoping slot intersection sections $A_1$ on one side serves as the movable support point (a temporary support point) while the other tilting/telescoping slot orientations combine to provide tilt angles different from those described above (angles that are not along the tilting slot orientation). This allows angles to be set freely.

In this configuration, universal joint 13 connecting steering shaft 10 and middle shaft 12 is displaced appropriately. The retractable and pivotable structure of middle shaft 12 allows the connecting universal joint between steering shaft 10 and middle shaft 12 to be positioned appropriately.

Figure 17:
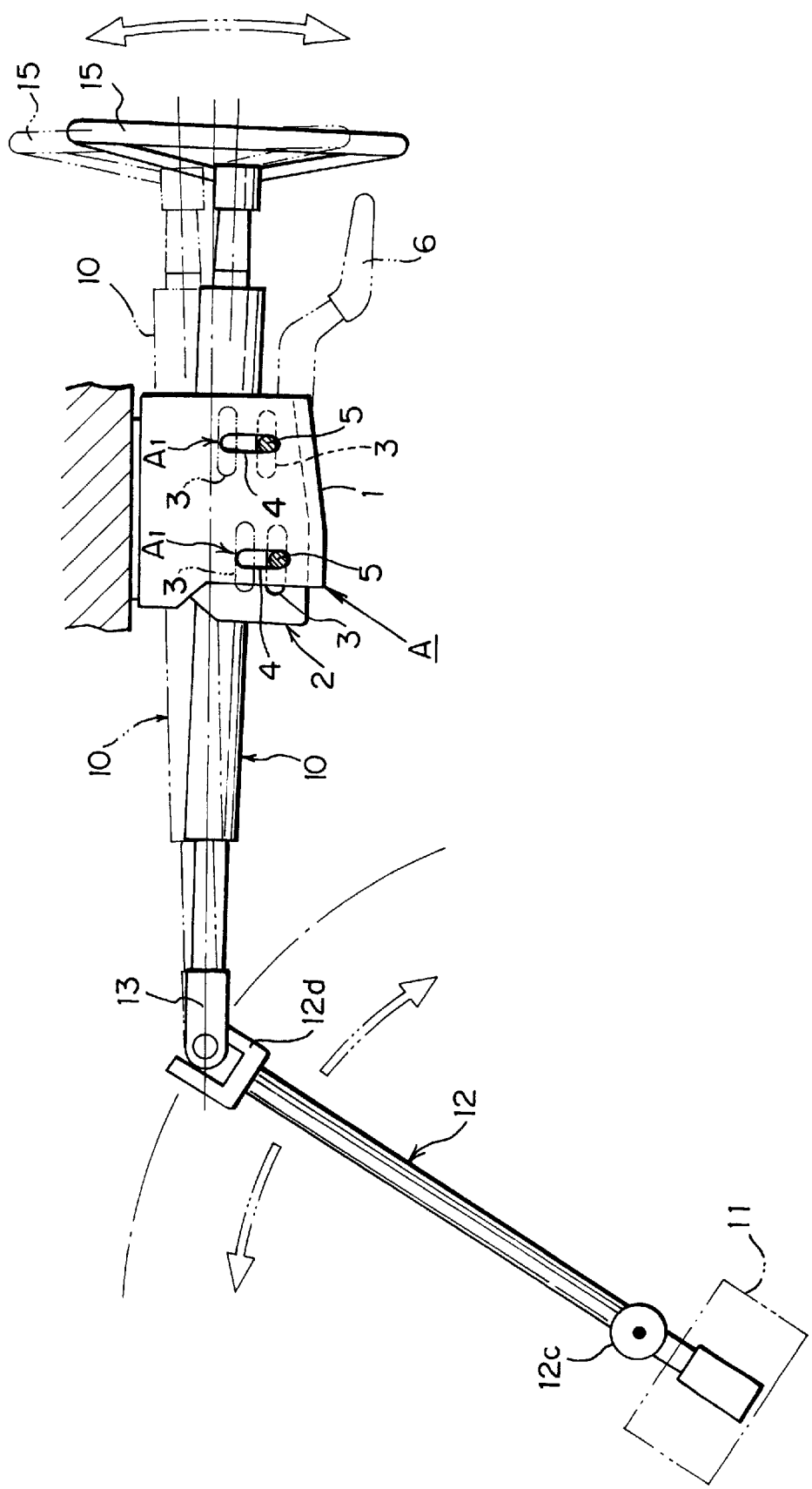
FIG. 17 is a side-view drawing showing a steering shaft that uses a non-retractable rigid axis as the middle shaft.

Referring to FIGS. 16 and 17, if a non-retractable middle shaft 12 is used, pivot center 12c serves as the pivot center and connecting section 12d forms an arcuate path. By using two slot intersection sections $A_1$, steering shaft 10 can be displaced up and down. This allows the tilt of steering wheel 15 to be adjusted. Also, when steering shaft 10 is displaced along the arcuate path of connecting section 12d, steering shaft 10 is displaced roughly along an axial direction by following horizontal slot 3 of slot intersection section $A_1$. This structure allows the telescoping of steering wheel 15 within the range defined by horizontal slot 3.

The support position of steering shaft 10 when tilting is performed is either the pivot point from pivot center point 12c or the movable support from slot intersection section $A_1$. These pivot points operate independently or together to determine the operation of steering shaft 10. The pivot point lies in a position in slot intersection section $A_1$ and allows optimal balance when adjusting positions by providing a free (unlocked) state along the tilting direction. The pivot point can pivot according to the displacement of steering shaft 10 during tilt adjustment, or can serve as the pivot when steering shaft 10 is displaced up or down.

When the steering wheel 15 is tilted, steering shaft 10 is in a free (unlocked) state with regard to the tilt direction. During adjustment of steering wheel 15, the movable pivots at the two slot intersection sections $A_1$ are positioned to allow optimal balance.

When steering shaft 10 is displaced along the pivot path of connecting position 12d around the pivot center section 12c of middle shaft 12, steering shaft 10 is displaced axially along the axis of horizontal slot 3 of slot intersection section $A_1$ of bracket A.

The following is a description of the advantages provided by each embodiment of the present invention.

In one embodiment of the present invention, a device for adjusting the position of a steering wheel includes: fixed bracket 1 fixed to a vehicle body; movable bracket 2 supported by fixed bracket 1; steering shaft 10 mounted on movable bracket 2; horizontal slot 3 formed on either one of fixed bracket 1 or movable bracket 2; vertical slot 4 formed on the other element of fixed bracket 1 or movable bracket 2; and tightening shaft 5 passing through horizontal slot 3 and vertical slot 4. Movable bracket 2 is mounted in fixed bracket 1 and the range in which horizontal slot 3 and vertical slot 4 intersect forms slot intersection section $A_1$. Two slot intersection sections $A_1$ are disposed along an axis of steering shaft 10. Tightening shaft 5 passes through slot intersection sections $A_1$ to allow fixed bracket 1 and movable bracket 2 to be fixed appropriately. Using a very simple structure, tilting, telescoping and adjustment of the rotation plane and the like is performed for steering wheel 15.

More specifically, two slot intersection sections $A_1$, formed on fixed bracket 1 and movable bracket 2 from horizontal slot 3 and vertical slot 4, are disposed along an axis of steering shaft 10. Slot intersection sections $A_1$ are fixed appropriately using tightening shaft 5. Movable bracket 2 can be moved relative to fixed bracket 1 over a range defined by horizontal slot 3 and vertical slot 4 of slot intersection section $A_1$. By displacing movable bracket 2, steering shaft 10 is displaced up and down to provide tilting. Also, by displacing steering shaft 10 axially, telescoping is provided. Since two slot intersection sections $A_1$ are disposed axially along steering shaft 10, the rotation plane of steering wheel 15 of steering shaft 10 is inclined as well. Thus, the present invention allows adjustments to be made in various directions using a very simple structure.

In another embodiment of the present invention, a device for adjusting the position of a steering wheel includes: fixed bracket 1 fixed to a vehicle body; movable bracket 2 supported by fixed bracket 1; steering shaft 10 mounted on movable bracket 2; horizontal slot 3 formed on either one of fixed bracket 1 or movable bracket 2; vertical slot 4 formed on the other element of fixed bracket 1 or movable bracket 2; tightening shaft 5 passing through horizontal slot 3 and vertical slot 4; and middle shaft 12 pivotably connecting steering shaft 10 and steering gear 11 through universal joints. Movable bracket 2 is mounted in fixed bracket 1 and the range in which horizontal slot 3 and vertical slot 4 intersect forms slot intersection section $A_1$. Two slot intersection sections $A_1$ are disposed along an axis of steering shaft 10. Tightening shaft 5 passes through slot intersection sections $A_1$ to allow fixed bracket 1 and movable bracket 2 to be fixed appropriately. Thus, a device for adjusting tilting is formed with a very simple structure.

More specifically, two slot intersection sections $A_1$, formed on fixed bracket 1 and movable bracket 2 from horizontal slot 3 and vertical slot 4, are disposed along an axis of steering shaft 10. Slot intersection sections $A_1$ are fixed appropriately using tightening shaft 5. Steering shaft 10 connects to a pivotable middle shaft 12. Thus, the tilt of steering wheel 15 mounted on steering shaft 10 can be adjusted in a manner providing a very stable operating feel through the pivoting of middle shaft 12, which does not retract axially, and two slot intersection sections $A_1$ of bracket A supporting steering shaft 10.

As a result, the tilt of steering wheel 15 mounted on steering shaft 10 is smoothly adjusted. The range of tilt adjustment is easily expanded. This allows adjustments to be made freely. Also, since the pivot point (the movable support point) is fixed firmly as with the adjustment sections of bracket A, vibrations are prevented and the steering column is firmly fixed and supported. Furthermore, when adjusting the tilt, tensile stress is not applied to middle shaft 12 or steering gear 11. This allows the tilt to be adjusted smoothly. In addition, the tilt range is easily expanded within a restricted range, allowing adjustments to be made freely.

Even with the structure above, the configuration of the present invention primarily involves the formation of horizontal slot 3 and vertical slot 4 on fixed bracket 1 and movable bracket 2 respectively. This structure provides a very simple structure which is also compact and light.

In yet another embodiment of the present invention, a device for adjusting the position of a steering wheel includes an axially retractable and extendable middle shaft 12. As a tilting/telescoping adjustment device, easy adjustment of the incline of the rotation plane of the steering wheel is provided while keeping the structure simple. More specifically, two slot intersection sections $A_1$, formed on fixed bracket 1 and movable bracket 2 from horizontal slot 3 and vertical slot 4, are disposed along an axis of steering shaft 10. Tightening shaft 5 passes through slot intersection section $A_1$. By tightening tightening shaft 5, movable bracket 2 is fixed at an appropriate position to fixed bracket 1. The positioning of movable bracket 2 is performed based on the range defined by the orientations of horizontal slot 3 and vertical slot 4. Also, middle shaft 12 can be extended and retracted axially. When steering shaft 10 connected to middle shaft 12 is displaced according to slot intersection section $A_1$, middle shaft 12 expands or retracts according to the displacement of steering shaft 10. Thus, steering shaft 10 is displaced smoothly, allowing more efficient operation.

This structure provides further improvements in the standard tilting/telescoping adjustments as well as in the incline adjustments for the rotation plane of steering wheel 15, thus allowing the driver to easily select a position most comfortable for driving. While having the structure described above, the structure of the present invention primarily involves forming slot intersection sections $A_1$ from horizontal slot 3 and vertical slot 4 formed on fixed bracket 1 and movable bracket 2, respectively, as well as using middle shaft 12 that is axially extendable and retractable. Thus, the structure is kept simple, compact, and light.

Another embodiment of the present invention provides a device for adjusting a steering wheel as described in the previous embodiment where a single slot intersection section $A_1$ is disposed along an axis of steering shaft 10. This reduces the number of parts and the number of production steps involved.

More specifically, since only one slot intersection section $A_1$ is formed on bracket A, the number of processing steps will obviously be less than forming two slot intersection sections $A_1$. Also, since only one slot intersection section $A_1$ is used, only one tightening shaft 5 is needed, which also reduces the number of parts and further simplifying the overall structure.

In still another embodiment of the present invention, a device for adjusting the position of a steering wheel includes: fixed bracket 1 fixed to a vehicle body; movable bracket 2 supported by fixed bracket 1; steering shaft 10 mounted on movable bracket 2; horizontal slot 3 formed on either one of fixed bracket 1 or movable bracket 2; vertical slot 4 formed on the other element of fixed bracket 1 or movable bracket 2; tightening shaft 5 passing through horizontal slot 3 and vertical slot 4; and flexible transmission means interposed between steering shaft 10 and steering gear 11. Movable bracket 2 is mounted in fixed bracket 1 and the range in which horizontal slot 3 and vertical slot 4 intersect forms slot intersection section $A_1$. Two slot intersection sections $A_1$ are disposed along an axis of steering shaft 10. Tightening shaft 5 passes through slot intersection sections $A_1$ to allow fixed bracket 1 and movable bracket 2 to be fixed appropriately. Different types of transmission means can be used for flexible transmission means B between steering shaft 10 and steering gear 11.

Examples of the structures that can be used for flexible transmission means B include a cable steering device using cables and a mechanism in which the rotation of steering shaft 10 is converted into an electrical signal used to control steering gear 11. These provide a flexible connection between steering shaft 10 and steering gear 11.

Compared to the embodiment that uses middle shaft 12 between steering shaft 10 and steering gear 11, a greater degree of freedom is provided for the positioning of steering shaft 10 and steering wheel 15. Also, steering shaft 10 is not restricted by its position relative to steering gear 11. Thus, the tilting and telescoping operations for steering shaft 10 are performed even more smoothly.

Another embodiment of the present inventions provides for two slot intersection sections $A_1$ positioned on a single line along an axis of steering shaft 10 when steering shaft 10 is in its initial position. When fixed bracket 1 and movable bracket 2 are assembled, the intersection of horizontal slot 3 and vertical slot 4 to form slot intersection section $A_1$ is precisely aligned, thus providing high accuracy.

In contrast to the previous embodiment, a further embodiment of the present invention provides for two slot intersection sections $A_1$ positioned on different lines along an axis of steering shaft 10 when steering shaft 10 is in its initial position. This allows one of the two slot intersection sections $A_1$ to be used as the pivot point during adjustments.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A device for adjusting the position of a steering wheel comprising:
    a fixed bracket fixed to a vehicle body;
    a movable bracket supported by said fixed bracket;
    a steering shaft on said movable bracket;
    two first slots on an axial direction of said steering shaft, on one of said fixed bracket and said movable bracket;
    two second slots at an angle to said two first slots, on the other of said fixed bracket and said movable bracket;
    two slot intersection sections formed by an intersection of said two first slots and said two second slots;
    two tightening shafts passing through said two slot intersection sections; and
    tightening means for tightening said movable bracket against said fixed bracket, to fix said steering wheel at a user selected position.

2. A device according to claim 1, wherein said two slot intersection sections are positioned co-linear along said axial direction of said steering shaft when said steering shaft is in its initial position.

3. A device according to claim 2, wherein said two slot intersection sections are positioned along a single line parallel to an axis of said steering shaft, when said steering shaft is in its initial, neutral position.

4. A device according to claim 1, wherein said two slot intersection sections are positioned on different lines alone an up/down direction along said axial direction of said steering shaft, when said steering shaft is in its initial, neutral position.

5. A device for adjusting the position of a steering wheel comprising:
- a fixed bracket fixed to a vehicle body;
- a movable bracket supported by said fixed bracket;
- a steering shaft on said movable bracket;
- an intermediate shaft having a first end movably connected to said steering shaft;
- said middle shaft having a second end connected to a steering gear;
- two first slots, on an axial direction of said steering shaft, on one of said fixed bracket and said movable bracket;
- two second slots, at an angle to said first slot, on the other of said fixed bracket and said movable bracket;
- two slot intersection sections formed by an intersection of said two first slots and said two second slots;
- two tightening shafts passing through said two slot intersection sections; and
- tightening means for tightening said movable bracket against said fixed bracket, to fix said steering wheel at a user selected position.

6. A device according to claim 5, further comprising universal joints at said first and second ends of said intermediate shaft providing pivotable connections of said intermediate shaft to said steering shaft and said steering gear.

7. A device according to claim 5, wherein said middle shaft is axially extendable and retractable.

8. A device according to claim 5, wherein said two slot intersection sections are positioned co-linearly along said axial direction of said steering shaft when said steering shaft is at its initial position.

9. A device according to claim 8, wherein said two slot intersection sections are positioned along a single line parallel to an axis of said steering shaft, when said steering shaft is in its initial, neutral position.

10. A device according to claim 5, wherein said two slot intersection sections are positioned on different lines along the up/down direction along said axial direction of said steering shaft, when said steering shaft is in its initial position.

11. A device for adjusting the position of a steering wheel comprising:
- a fixed bracket fixed to a vehicle body;
- a movable bracket supported by said fixed bracket;
- a steering shaft on said movable bracket;
- a flexible transmission means interposed in place of a shaft between said steering shaft and a steering gear;
- two first slots, on an axial direction of said steering shaft, on one of said fixed bracket and said movable bracket;
- two second slots, at an angle to said first slot, on the other one of said fixed bracket and said movable bracket;
- two slot intersection sections formed by an intersection of said two first slots and said two second slots;
- two tightening shafts passing through said slot intersection section; and
- tightening means for tightening said movable bracket against said fixed bracket, to fix said steering wheel at a user selected position.

12. A device according to claim 11, wherein said flexible transmission means includes one of a cable steering device and a mechanism in which rotation of said steering shaft is converted into an electrical signal to control said steering gear.

13. A device according to claim 12, wherein said two slot intersection sections are positioned along a single line parallel to an axis of said steering shaft, when said steering shaft is in its initial, neutral position.

14. A device according to claim 11, wherein said two slot intersection sections are positioned on different lines along the up/down direction along said axial direction of said steering shaft, when said steering shaft is in its initial position.

* * * * *